United States Patent [19]

Gutbrod

[11] Patent Number: 4,529,279
[45] Date of Patent: Jul. 16, 1985

[54] EYEGLASS FRAME

[75] Inventor: Heinz Gutbrod, Leonberg, Fed. Rep. of Germany

[73] Assignee: Röhm-Optik GmbH, Leonberg, Fed. Rep. of Germany

[21] Appl. No.: 494,637

[22] Filed: May 16, 1983

[30] Foreign Application Priority Data

May 14, 1982 [DE] Fed. Rep. of Germany ....... 3218191

[51] Int. Cl.³ .......................... G02C 5/12; G02C 1/00
[52] U.S. Cl. ........................................ 351/137; 351/76
[58] Field of Search ................... 351/76, 88, 137, 136, 351/138, 132, 77

[56] References Cited

U.S. PATENT DOCUMENTS 1,784,013 12/1930 Kern .................................... 351/137
2,080,847 5/1937 Bouchard ............................ 351/137

Primary Examiner—Rodney B. Bovernick

[57] ABSTRACT

The invention is an improved eyeglass frame, having pivotally mounted noseplates. The invention makes it possible to provide eyeglass frames which are made of plastic material at least in the region of the nose support in which metal support plates are pivotally mounted. This is achieved by having an integral cantilevered arm extending from the frame and nose support plates which snaps onto the cantilevered arm in a way that allows the nose plates to pivot and yet remain secure. The pivotal mounting is accomplished by means of a bearing support pan in the arm which coacts with a nipple like projection on the rear of the nose support plates. The support plates are held in position on the cantilevered arm by use of a stirrup extending from the rear of the nose support plates.

11 Claims, 6 Drawing Figures

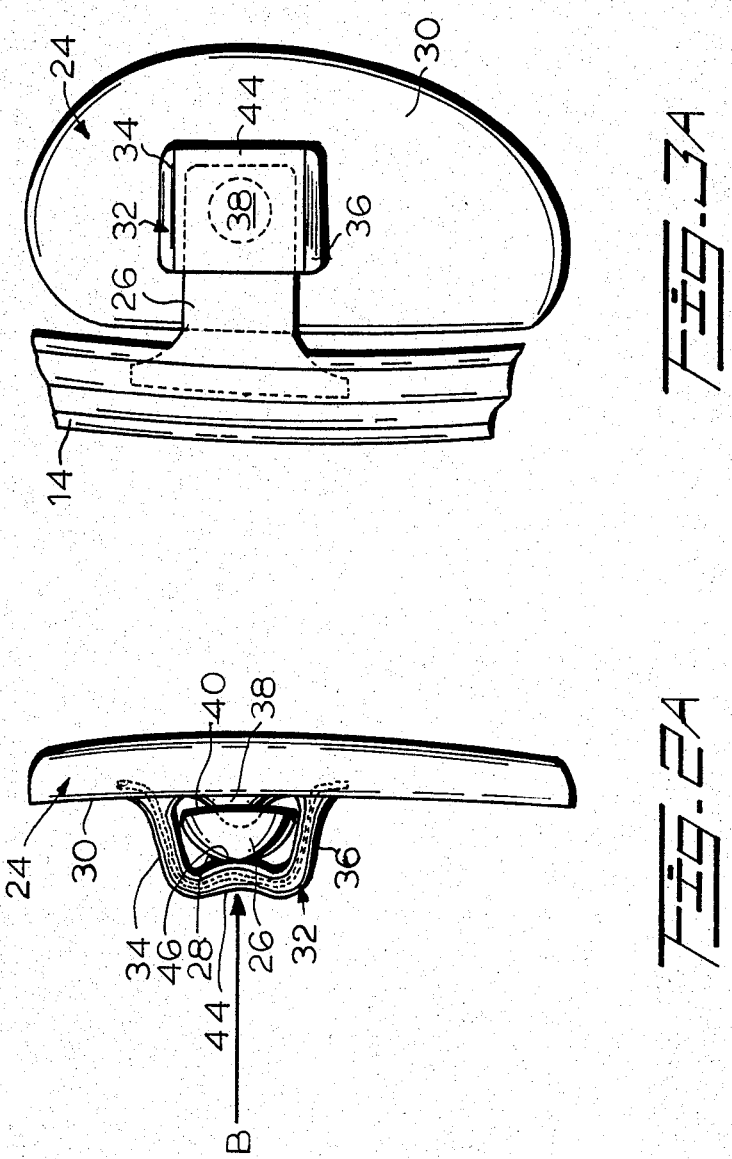

EYEGLASS FRAME

BACKGROUND OF THE INVENTION

The invention relates to an eyeglass frame of which at least the portion for receiving the lenses is made out of synthetic material. Eyeglass frames generally include on the frame portion which receives the lenses oppositely positioned nose support plates made out of synthetic material.

There are known a large number of eyeglass frames made out of metal as well as out of synthetic material. The metallic eyeglass frames usually have at the nose support side a cantilevered projecting arm made out of metal on which the nose support plate, made out of synthetic material, is movably mounted. In this way it is possible to support the eyeglasses on the nose via the support plates. The conventionally known eyeglass frames made out of synthetic material do not have pivotally movable nose support plates. They exhibit generally only a thickening of the frame supporting the lenses in the region confronting the nose. It was heretofore not possible to make synthetic eyeglass frames having a pivotally movable nose support plate without using a complex metal pivot construction.

SUMMARY OF THE INVENTION

The invention has as an object to provide a mounting for the nose support plates on the eyeglass frame permitting a movement of the nose support plates. Such new mounting is preferably made without having to use any metal parts and provides a reliable connection between the nose support plates and the eyeglass frame. Moreover, this kind of mounting simultaneously is wear-free and also does not irritate the skin.

The afore-described object of the invention is achieved by means of an eyeglass frame made out of synthetic material in such a way that the nose support plates are mounted on a structure that is preferably made out of synthetic material and forms a part of the eyeglass frame portion for receiving the lenses. Preferably it is provided that the mounting is made of a unitary construction and is integral with the frame before receiving the lenses. In lieu of this first embodiment, it is also possible to have the mounting made partially out of metal. Either the part that is anchored in the synthetic material forming part of the eyeglass frame portion receiving the lens or the stirrup on the nose support plate may be made out of metal, but not both.

Polyamide has been found to be a suitable synthetic material for the eyeglass frame providing a stable and secure mounting.

The simple manufacture of the eyeglass frame of the invention is made possible by the fact that the mounting is formed by cantilevered arms and the nose support plates are mounted on these cantilevered arms by biasing means of a pop-in connection at the free end of the arm. Thereby it is possible to position the nose support plates in the mounting by the biasing means of a snap-in connection.

According to a further preferred embodiment of the invention, one part of the pop-in or snap-in connection is in the form of a support pan and the other part is in the form of a therein engaging nipple-like projection which form-lockingly engages therein.

It can be further advantageous to position the nipple-like projection on the rear side of the nose support plate and within a passage, which is formed by means of the rear side of the nose support plate and U-shaped stirrup. The stirrup bridge which forms the connection for the stirrup shanks maintains the nipple-like projection in contact with the support pan of the cantilevered arm so that it is freely movably mounted thereon but secure.

BRIEF DESCRIPTION OF THE DRAWING

Further details and advantages of the invention will be described in conjunction with the following description and the appended drawings, in which one embodiment of the invention is illustrated by way of example only:

FIG. 2A is a view similar to FIG. 2 showing an alternate use of metal wire in the stirrup 32;

FIG. 3A is a view similar to FIG. 3 showing an alternate use of a metal pan 26 embedded in the frame 14.

DETAILED DESCRIPTION

Figure 1:
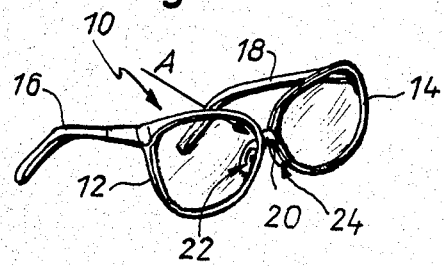
FIG. 1 is a perspective view of a pair of eyeglasses which are provided with two nose support plates forming part of this invention.
Figure 2:
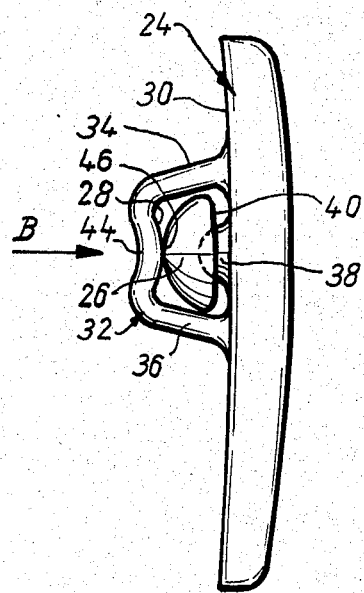
FIG. 2 is a side-elevational view of one of the nose support plates in the direction of the arrow A in FIG. 1, illustrated in an enlarged scale.
Figure 3:
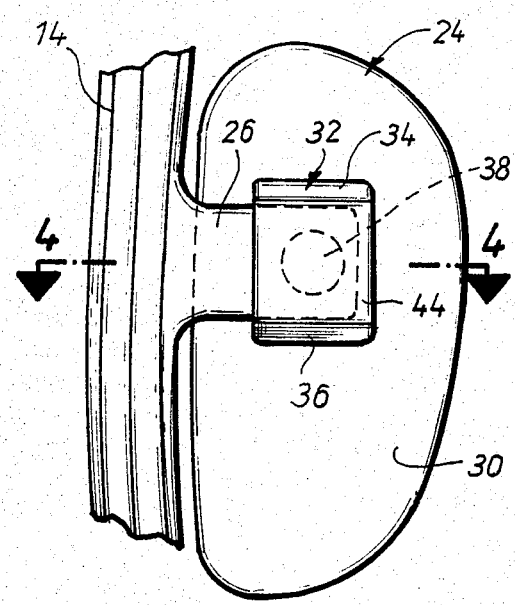
FIG. 3 is a side-elevational view of the nose support plate in accordance with FIG. 2 in the direction of the arrow B in FIG. 2.

The eyeglasses illustrated in FIG. 1 include an eyeglass frame 10 preferably made out of polyamide. The lens receiving portions 12, 14 of the frame 10, each have a temple 16, 18 pivotally connected thereto. Both lens receiving frame portions are connected to each other via a rigid bridge 20. At the rear side of the lens receiving frame portions, underneath the bridge 20, there are provided the usual nose support plates 22, respectively 24. In FIG. 2, these nose support plates are swingably mounted on the free ends of cantilevered arms 26 which extend from each lens receiving frame portion rearward.

The arms 26 are integral with the lens receiving portions which, with their free ends, extend through a passage 28 formed by a stirrup 32 having shanks 34, 36 and a bridge 44. This cantilevered arm 26 may be mounted with lateral play within the stirrup 32.

The arms 26 are preferably made out of synthetic material but may be made out of metal if the stirrups 32 are made out of synthetic material or are formed by a wire embedded in a synthetic material. The stirrup 32 projects from the rear side 30 of the nose support plate and is preferably in the form of a U-shaped stirrup 32 having the stirrup shanks 34, 36. These shanks form, jointly with the stirrup bridge 44 a one-piece unitary construction made out of synthetic material, whereby they are preferably made out of the same material as the eyeglass frame proper. The stirrup bridge 44 can also be made out of metal wire if the arm 26 is made out of a synthetic material.

For achieving a pivotally movable connection between the nose support plates 22, 24 and the cantilevered arms 26 there is provided at the rear side 30 of the nose support plate within the stirrup 32 a corresponding nipple-like projection 38, which coacts with the confronting surface 40 of the free end of the cantilevered arm 26 projecting into the stirrup 32, which free end forms a support bearing pan 42, in which the nipple-like projection 38 form-lockingly engages because the nipple-like projection 38 is substantially concentric with respect to the support bearing pan 42. The opposite outer surface of the bearing pan 42 of the cantilevered arm 26 is convexly shaped and contacts the bridge 44 which joins the two stirrup shanks 34, 36. This bridge is bent and curved inwardly, whereby an elastic yet yielding coaction beween the convexly shaped surface of the bearing pan 40 and the inwardly bent bridge portion 44 is achieved. The bridge 44 always biases the support bearing pan 42 into a sliding bearing contact between the support bearing pan 42 and the nipple 38. For this purpose the distance between the bridge 44 from the cup of the nipple 38 is smaller than the radial distance between the outer surface of the bearing pan 40 to the deepest position of the inner surface of the bearing pan 40. Thereby the stirrup 32, cantilevered arm 26 and the nipple-like projection 38 form a snap-in connection, which provides for a mutual swinging and tipping movement of the nose support plates relative to the cantilevered arms similar to that of a ball and socket while at the same time providing for a detachable connection as well.

Figure 4:
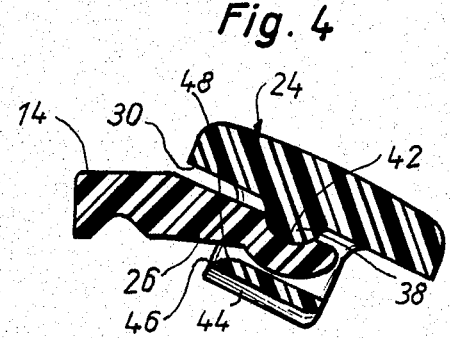
FIG. 4 is a cross-sectional view of line 4—4 along FIG. 3.

The mutual disengagement of the cantilevered arm and the nose support plates is facilitated by the fact that the bridge 44 of the stirrup 32 is machined at an inclination at the inner edge 46 which confronts the lens receiving frame portion 12, 14, and is rounded-off at this edge, as is shown in FIG. 4 with the reference number 48. This makes it easier to slip the nose support plate off the arm 26 once the snap-in connection has been disengaged.

The afore-described eyeglasses have the advantage of making it possible to provide an eyeglass frame of synthetic material which can pivotally support the nose support plates, whereby a comfortable and individually fitted nose support for the eyeglasses is possible.

Despite the fact that preferably the mounting for the nose support plate can be made by means of a single injection molding step, where at least a portion of the eyeglass frame is made out of synthetic material in one piece, it is possible in accordance with the spirit of the invention also to make a portion of the mounting out of metal wire, which should be covered with a layer of synthetic material and is anchored into the eyeglass receiving portion of the eyeglass frame or can be molded thereon.

Although the invention is described and illustrated with reference to a plurality of embodiments thereof, it is to be expressly understood that it is in no way limited to the disclosure of such preferred embodiments but is capable of numerous modifications within the scope of the appended claims.

I claim:

1. An improvement in an eyeglass frame having at least the portion of the frame which receives the lens made out of plastic material and having a pair of nose support plates mounted thereon, the improvement comprising, a stirrup extending from each of said nose support plates each of which defines a passage;

a cantilevered arm extending from each of said frame portions of the frame which receive the lenses;

said arm and stirrup forming biasing means urging said cantilevered arm and said stirrup into mutual engagement with each other so that said nose support plate can pivot about said cantilevered arm but is disengageable therefrom by means of the application of a predetermined force;

said cantilevered arm is integral with said portion of the frame which receives the lens;

said biasing means forms a snap-in, snap-out connection between said cantilevered arm and said stirrup;

said snap-in, snap-out connection is formed as follows: the free end of said cantilevered arm is substantially shaped as a hollow hemisphere which extends into said passage of said stirrup; the surface of said nose support plate which confronts said stirrup has a nipple-like projection which extends and form-lockingly engages into said hemisphere; said stirrup is formed by a pair of shanks which are joined by a bridge, said bridge biases said hemisphere against said nipple-like projection.

2. The improvement in an eyeglass frame as set forth in claim 1, wherein said snap-in, snap-out connection between said cantilevered arm and said stirrup permits a free pivotal movement of said nose support plate about said cantilevered arm.

3. The improvement in an eyeglass frame as set forth in claim 2, wherein the distance between the bridge, which joins the pair of stirrup shanks, and said nipple-like projection is smaller than the radial wall thickness of said hemisphere.

4. The improvement in an eyeglass frame as set forth in claim 3, wherein the inner surface of said hemisphere is substantially concentric with respect to the outer surface of said nipple-like projection.

5. The improvement in an eyeglass frame as set forth in claim 4, wherein said bridge which joins said pair of stirrup shanks is chamfered at one of its sides.

6. The improvement in an eyeglass frame as set forth in claim 5, wherein said bridge is convexly shaped in the direction of said nipple-like projection.

7. The improvement in an eyeglass frame as set forth in claim 6, wherein the width of said passage of said stirrup is wider than the diameter of said hemisphere.

8. The improvement in an eyeglass frame as set forth in claim 7, wherein said stirrup is made of plastic material.

9. The improvement in an eyeglass frame as set forth in claim 8, wherein said plastic material is polyamide.

10. The improvement in an eyeglass frame as set forth in claim 7, wherein said stirrup is made of a metal wire embedded in said nose support plate which wire is covered with a layer of plastic material.

11. The improvement in an eyeglass frame as set forth in claim 1, wherein said cantilevered arm is made out of metal which is embedded in the plastic material forming the lens-receiving portion of the eyeglass frame.

* * * * *